United States Patent

Krambeck

[11] Patent Number: 5,119,999
[45] Date of Patent: Jun. 9, 1992

[54] DUAL MODE SEAT BELT RETRACTOR

[75] Inventor: Dagoberto Krambeck, Sterling Heights, Mich.

[73] Assignee: General Safety Corporation, St. Clair Shores, Mich.

[21] Appl. No.: 552,143

[22] Filed: Jul. 13, 1990

[51] Int. Cl.[5] ............................................. B60R 22/40
[52] U.S. Cl. ........................ 242/107.4 A; 242/107.4 R
[58] Field of Search .................. 242/107.4 A, 107.4 B, 242/107.4 C, 107.4 D, 107.4 R; 280/806; 297/478

[56] References Cited

U.S. PATENT DOCUMENTS

| | | | |
|---|---|---|---|
| 4,518,132 | 5/1985 | Schmidt | 242/107.4 A |
| 4,552,319 | 11/1985 | Gavagan et al. | 242/107.4 A |
| 4,566,649 | 1/1986 | Petersen | 242/107.4 A |
| 4,573,646 | 3/1986 | Willey | 242/107.4 A |
| 4,583,701 | 4/1986 | Matsui et al. | 242/107.4 A |
| 4,765,558 | 8/1988 | Higbee | 242/107.4 A |
| 4,967,977 | 11/1990 | Gavagan et al. | 242/107.4 A |

Primary Examiner—John M. Jillions
Attorney, Agent, or Firm—Harness, Dickey & Pierce

[57] ABSTRACT

A combination seat belt retractor particularly useful for motor vehicles is disclosed. The seat belt retractor according to this invention converts between an emergency locking retractor which locks only when the vehicle is subjected to a deceleration level above a predetermined level to an automatic locking mode wherein the seat belt webbing cannot be withdrawn from the retractor. The convertible feature is particularly advantageous since an emergency locking retractor does not provide the desired firm positioning of child restraint systems. The emergency locking retractor, however, has advantages in terms of occupant comfort and convience since they permit free movement of the occupants within the vehicle. In accordance with this invention, the retractor is converted to the automatic locking mode by first fully withdrawing the seat belt webbing therefrom. Such action causes a switching lever to pivot a cam member in a first direction for biasing a cantilevered spring member against the retractor locking bar. When, however, a predetermined amount of seat belt webbing is returned upon the retractor spool, the cam member is pivoted in a second direction to its normal position, thereby restoring emergency locking operation to the retractor.

19 Claims, 2 Drawing Sheets

DUAL MODE SEAT BELT RETRACTOR

BACKGROUND AND SUMMARY OF THE INVENTION

This invention relates to a motor vehicle seat belt retractor and particularly to a retractor which can be operated both as an emergency locking retractor or an automatic locking retractor.

Most motor vehicles are equipped with seat belt systems which act to restrain the occupants when the vehicle is subjected to high rates of deceleration which may occur, for example, during a motor vehicle collision. Many seat belt retractors are of the so-called "emergency" locking variety. These retractors employ an inertia sensitive actuator which prevents seat belt webbing from being withdrawn from the retractor when the vehicle is subjected to deceleration forces above a predetermined level, thereby restraining the vehicle occupant. During normal operating circumstances, however, the seat belt webbing may be freely withdrawn from the retractor, enabling freedom of movement by the vehicle occupants.

Another type of seat belt retractor is often referred to as an "automatic" locking retractor. When using these retractors, the seat belt webbing is fully withdrawn from the retractor and, as webbing is thereafter retracted within the retractor, a locking bar engages sprockets within the retractor thus preventing withdrawal. These retractors therefore, act as a one-way clutch once the webbing is fully withdrawn, permitting webbing to be retracted within the retractor but not withdrawn. When, however, the seat belt is unfastened and the webbing is fully retracted within the retractor, the webbing can again be withdrawn.

The emergency locking retractor design has many advantages in terms of occupant comfort and convenience, since they permit free movement of the occupants until deceleration forces above a predetermined level are sensed. Emergency locking retractors, however, have been found undesirable when used to fasten a child restraint system within the vehicle. For this application, it is desirable that the seat belt system firmly and securely anchor the child restraint system to the vehicle. Since automatic locking retractors do not permit free withdrawal of webbing, they are preferable for anchoring a child restraint system within the vehicle.

Due to the need to provide adult occupant comfort and convenience, and the need to securely fasten child restraint systems within vehicles, it is desirable to provide a combination seat belt retractor which may be converted between emergency locking operation and automatic locking operation in accordance with the needs of the user. It is therefore a principal object of this invention to provide such a combination seat belt retractor. It is a further object of this invention to provide a combination emergency locking and automatic locking retractor which is easily switched between operational modes. It is yet another object of this invention to provide a combination seat belt retractor which is simple in design and inexpensive. It is yet another object of this invention to provide a combination retractor having an automatic locking mechanism which is independent of the emergency locking inertia actuator, thereby not adversely affecting the reliability of the emergency locking feature of the retractor.

The above principal objects of this invention are achieved by providing an emergency locking retractor having a pivotable cam member acting on a cantilevered spring member. Pivotable movement of the cam member in one direction moves the spring member for directly biasing the retractor locking bar against the toothed sprockets of the retractor spool, thereby causing the retractor to operate in an automatic locking mode. The retractor according to this invention further includes a switching lever which pivots the cam member for moving the spring member so as to bias the locking bar to the automatic locking position when the seat belt webbing is fully withdrawn from the retractor. The retractor is designed such that when the spool is nearly fully wrapped with seat belt webbing, the webbing acts on the pivotable cam member to pivot the cam member in a second direction for moving the cantilevered spring member until it no longer biases the locking bar, thus returning the retractor to emergency locking operation.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
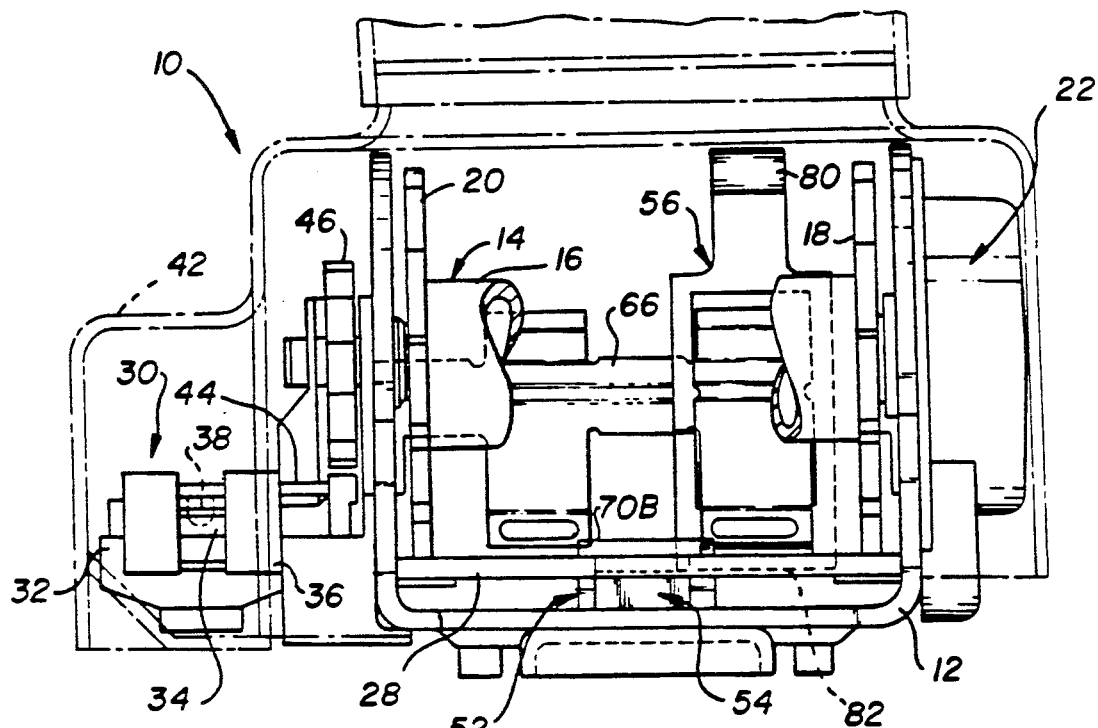
FIG. 1 is a front view of a combination seat belt retractor according to this invention.

A combination seat belt retractor according to this invention is shown assembled in FIGS. 1 through 4, and is generally designated there by reference character 10. Retractor assembly 10 includes retractor frame 12 to which rotatable spool 14 is mounted. Spool 14 includes a belt support shaft 16 terminating laterally in a pair of radially extending toothed sprockets 18 and 20. Torsion spring assembly 22 acts upon belt support shaft 16 to rotatably bias spool 14 so that a belt webbing retracting force is applied when webbing 24 is withdrawn from retractor 10. One end of seat belt webbing 24 is attached to belt support shaft 16 and becomes rolled onto spool 14 as it is rotated. Retractor frame 12 includes one or more mounting holes 26 for fasteners which permit secure attachment of retractor 10 to the associated vehicle. Retractor frame 12 is preferably enclosed by trim cover 42. Locking bar 28 is movable between a first "normal" position to a second "engaging" position (shown in phantom in FIG. 2) wherein the locking bar engages one of the teeth of toothed sprockets 18 and 20. Locking bar 28 is caused to move between the two definitive positions by inertia sensitive actuator 30 which includes housing 32 attached to frame 12, and internally disposed weighted element 34. Weighted element 34 moves to a tilted position whenever the associated motor vehicle, and hence the retractor assembly 10, are subjected to deceleration forces above a predetermined level (or when retractor frame 12 is tilted from its installed position). Once weighted element 34 is caused to move to a tilted position, locking lever 36 becomes raised due to contact between weighted element 34 and lug 38 of locking lever 36. Locking lever 36 rotates about pivot 40 between the "normal" and "engaged" positions.

Figure 2:
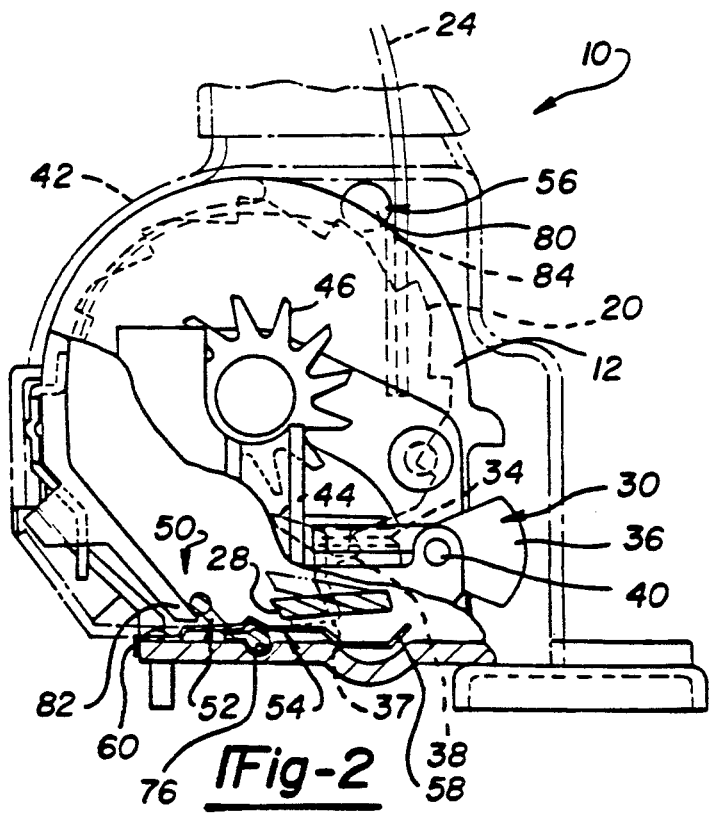
FIG. 2 is a side view of the combination seat belt retractor shown by FIG. 1 in an emergency locking mode according to the present invention.

When weighted element 34 of inertia sensitive actuator 30 moves toward a tilted position, locking lever 36 is caused to rotate in a clockwise direction, with respect to the orientation shown by FIG. 2. Once slightly rotated, actuator pawl 44 of locking lever 36 engages a tooth of spur gear 46 which is also rotatable with spool 14. Rotation of spool 14 causes continued rotation of locking lever 36 until locking bar pawl 37 contacts the underside of locking bar 28 urging it into engagement with a tooth of toothed sprockets 18 and 20. Actuator pawl 44 and spur gear 46 are provided to augment the rotational urging forces applied to locking lever 36 as weighted element 34 becomes tilted. Such augmentation results in improved reliability and accuracy of retractor locking and provides positive engagement between locking bar 28 and toothed sprockets 18 and 20.

The foregoing description describes components of an inertia sensitive emergency locking retractor design known to the prior art. In accordance with this invention, retractor 10 is also an automatic retractor actuator 50 which includes cam member 52, cantilevered spring member 54 and switching lever 56. Cantilever spring 54 is shown in detail by FIGS. 5 and 6 and includes two end tabs 58 and 60, and an offset portion 62. End tab 60 of cantilever spring 54 is secured adjacent a rear flange 64 formed along the lower portion of retractor frame 12 such as by rivet 61. Switching lever 56 is supported to pivot relative to rear cross member 66 which is attached to retractor frame 12.

Cam member 52 has a generally arcuate configuration with a central stem portion 68 terminating at opposite ends with bulbous end portions 70A and 70B. Arcuate stem portion 68 has a central cut-out 72 adapted to permit cantilevered spring 54 to extend therethrough. In particular, cam member 52 defines a tab 74 associated with an end of cut-out 72 and which is adapted to engage a lower surface of offset portion 62 of cantilever spring 54. First bulbous end portion 70A is mounted for pivotal motion in cylindrical slot 76 formed within the lower portion of retractor frame 12. Second bulbous end portion 70B is located to be acted upon by pivotal movement of switching lever 56 so as to pivot cam member 52 and, in turn, move cantilever spring member 54.

Figure 3:
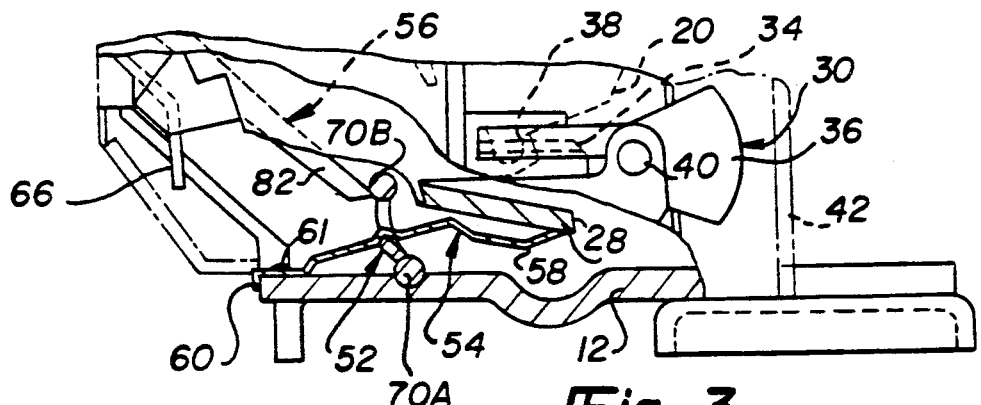
FIG. 3 is an enlarged partial side view, similar to FIG. 2, showing the retractor in an automatic locking mode.
Figure 4:
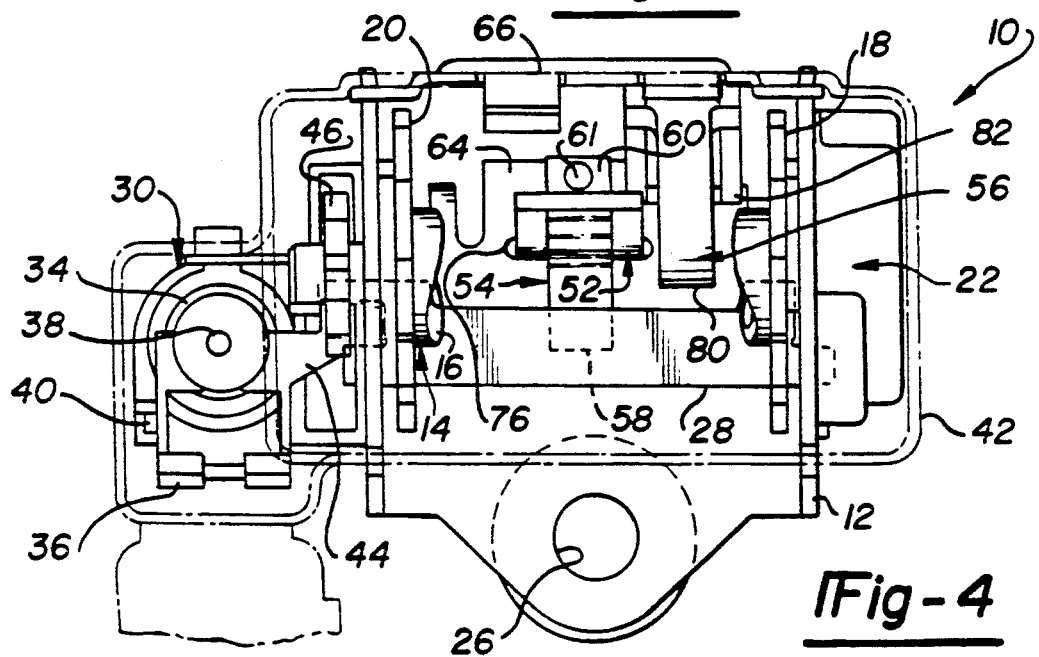
FIG. 4 is a plan view of the combination seat belt retractor shown by FIG. 1.

As is shown by FIGS. 2 and 3, cam member 52 is pivotable between a first and second position for acting upon cantilever spring member 54 which, in turn, acts upon locking bar 28. FIG. 2 illustrates a first pivoted position of cam member 52 and the corresponding orientation of cantilever spring 54 relative to locking bar 28 for defining the "normal" position. Alternatively, FIG. 3 illustrates a second pivoted position of cam member 52 wherein cantilever spring member 54 is acting on locking bar 28 for defining the "engaged" position. When cam member 52 is pivoted to its first position, combination seat belt retractor 10 functions as an emergency locking retractor since the belt webbing 24 can be freely withdrawn from the retractor 10 and movement of locking bar 28 is controlled by inertia sensitive actuator 30. On the other hand, when cam member 52 is pivoted to the second position, combination seat belt retractor 10 functions as an automatic locking retractor since seat belt webbing 24 cannot be withdrawn from retractor 10 due to cantilevered spring member 54 biasing locking bar 28 into engagement with toothed sprockets 18 and 20.

Cam member 52 is caused to pivot from its first position to its second position by the action of switching lever 56 acting on cam member 52. Switching lever 56 is pivotably mounted to cross member 66 and has two terminal ends, 80 and 82. End 80 is positioned to contact an edge 84 of seat belt webbing 24 presented when webbing 24 is fully withdrawn from spool 14. Alternately, contact may be achieved by a folded over portion of webbing 24 or other means of engaging switching lever 56. When such contact occurs, switching lever 56 is caused to pivot about cross member 66 such that end 82 contacts end portion 70B of cam member 52 for urging it to pivot toward the second position, thus changing the retractor into the automatic locking mode as explained above. When, however, seat belt webbing 24 is retracted onto spool 14, the accumulated wrapped webbing eventually comes in direct contact with end portion 70B of cam member 52 causing cam member 52 to pivot back to its first position, disengaging cantilever spring 54 from locking bar 28 and thereby allowing locking bar 28 to disengage from toothed sprockets 18 and 20. Therefore, retractor 10 is returned to the emergency locking mode.

In operation, when the user wishes to convert retractor 10 to the automatic locking mode, seat belt webbing 24 is fully withdrawn from the retractor, whereupon edge 84 engages switching lever end 80 causing cam member 52 to pivot to its second position and raise cantilever spring 54 to bias lock bar 28 into engagement with toothed sprockets 18 and 20. Once switched into the automatic locking mode, retractor 10 will remain in the automatic locking mode until webbing 24 is fully retracted onto the spool 14. Accordingly, to fasten a child restraint seat, for example, webbing 24 is initially fully withdrawn from spool 14 as described to place retractor 10 in the automatic locking mode. The seat belt is then secured to the child restraint seat and the belt latch plate fastened to the buckle in the conventional fashion, allowing the torsion spring assembly 22 to take up any slack in the belt. Once the slack has been removed, the child restraint seat is securely fastened.

When, however, the seat belt buckle is unfastened, seat belt webbing 24 is retracted onto spool 14 until the accumulated webbing 24 contacts cam member 52 causing it to pivot back to its first position and thereby returning retractor 10 to the emergency locking mode. It is desirable to cause such switching to occur at a point where seat belt webbing 24 is nearly fully retracted within retractor 10, therefore avoiding a return to emergency locking mode when a child restraint seat is fastened within the vehicle. When in use by an adult occupant, retractor 10 will normally remain in the emergency locking mode since most adult occupants do not fully withdraw seat belt webbing from a retractor in order to fasten the belt.

Figure 5:
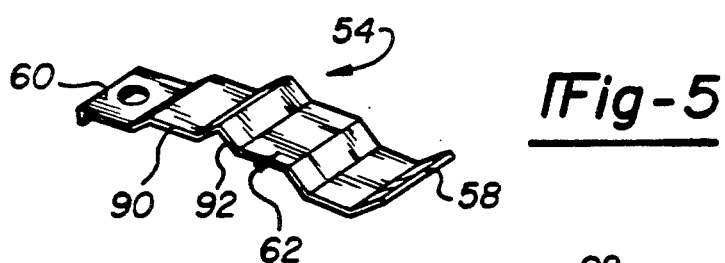
FIG. 5 is a perspective view of a cantilevered spring member which is incorporated into the combination seat belt retractor according to this invention.
Figure 6:
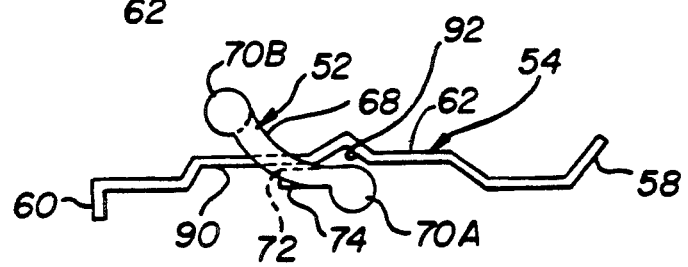
FIG. 6 is a side view of a cam member and the cantilevered spring member shown by FIG. 5.

Referring to FIGS. 5 and 6, an exemplary configuration of cantilevered spring member 54 is shown in greater detail. Offset portion 62 of cantilevered spring member 54 is shown as having a first stepped surface 90 and second stepped surface 92. Tab 74 of cam member 52 acts on one of said stepped surfaces 90 and 92 and tends to urge cam member 52 to remain in either the "engaged" or the "normal" positions. In particular, tab 74 engages first stepped surface 90 when cam member 52 is in the first pivoted position. Furthermore, tab 74 engages second stepped surface 92 when cam member 52 is in the second pivoted position. In this manner, cantilevered spring member 54 is angularly movable for selectively orienting locking bar 28 relative to toothed sprockets 18 and 20.

In order to not detract from the reliability of inertia sensitive actuator 30, automatic retractor device 50 and its components including cam member 52, cantilever spring member 54, and switching lever 56 operate independently from inertia sensitive actuator 30 since they act directly upon locking bar 28. The design according to this invention further provides a positive indication to the motor vehicle user regarding which mode of operation retractor 10 is in. While in the automatic locking mode, retracting of belt 24 causes an audible clicking sound as locking bar 28 moves along the teeth of tooth sprockets 18 and 20.

While the above description constitutes the preferred embodiments of the present invention, it will be appreciated that the invention is susceptible to modification, variation and change without departing from the proper scope and fair meaning of the accompanying claims.

What is claimed is:

1. A seat belt retractor which may be operated either as an emergency locking retractor which prevents seat belt webbing from being withdrawn when the retractor is subjected to deceleration above a predetermined level or as an automatic locking retractor which acts to retract said webbing but does not permit substantial withdrawal of said webbing comprising:
   a retractor frame;
   a spool rotatable within said frame and having at least one toothed sprocket;
   a locking bar engageable with said toothed sprocket thereby preventing withdrawal of said webbing from said spool;
   an inertia sensitive actuator acting upon said locking bar to cause engagement with said toothed sprocket when a deceleration level above said predetermined load is sensed;
   a cantilevered spring member having a first end attached to said retractor frame, an offset portion and a second end adapted to engage said locking bar;
   a cam member attached to said retractor frame and adapted to act on said offset portion of said cantilevered spring member, said cam member being pivotably movable between a first and a second position for selectively moving said cantilevered spring member relative to said locking bar, in said first position said cam member acts on said offset portion of said cantilevered spring member for biasing said locking bar to a position disengaged from said toothed sprocket so as to permit said locking bar to operate in response to said inertia sensitive actuator whereby said retractor operates as an emergency locking retractor, said cam member being forced into said first position when said spool has a predetermined quantity of said webbing wrapped thereon, whereas when said cam member is in said second position said cam member acts on said offset portion of said cantilevered spring member for biasing said locking bar to a position engaged with said toothed sprocket whereby said retractor operates as an automatic locking retractor, said offset portion of said cantilevered spring member is configured such that said cam member tends to remain in either of said first or second positions; and
   a switching lever affixed to said retractor frame, said switching lever acting upon said cam member for forcing said cam member into said second position when said webbing is withdrawn from said spool.

2. The seat belt retractor according to claim 1 further comprising switching means associated with said webbing for engaging said switching lever when said webbing is withdrawn from said spool.

3. The seat belt retractor according to claim 2 wherein said switching means comprises a free end of said seat belt webbing which engages said switching lever.

4. The seat belt retractor according to claim 2 wherein said switching lever is arcuate in shape and is pivotably attached to said retractor frame.

5. The seat belt retractor according to claim 4 wherein said switching lever forms first and second terminal ends, said first terminal end engaging said switching means, said second terminal end engaging said cam member and pivotally moving said cam member to said second position when said switching means engages said first terminal end.

6. The seat belt retractor according to claim 5 wherein when said spool has a predetermined quantity of webbing wrapped thereon said webbing engages said cam member and pivotally moves said cam member to said first position.

7. The seat belt retractor according to claim 4 wherein said switching lever pivots about a cross member component of said retractor frame.

8. The seat belt retractor according to claim 1 wherein said cam member is arcuate in shape forming first and second end portions and having a central passage through which said offset portion and second end of said cantilevered spring member extend, said cam member having a tab adapted to act on said offset portion of said cantilevered spring member, and wherein said first end portion is engageable with said switching lever and said second end portion is pivotally attached to said retractor frame.

9. A seat belt retractor apparatus which may be operated either as an emergency locking retractor which prevents seat belt webbing from being withdrawn when the retractor is subjected to deceleration above a predetermined level, or as an automatic locking retractor which acts to retract said webbing but does not permit substantial withdrawal of said webbing, said apparatus comprising:
   a retractor frame;
   a spool rotatable within said frame and having at least one toothed sprocket;
   locking means engageable with said toothed sprocket for preventing withdrawal of said webbing from said spool;
   said emergency locking retractor including an inertia sensitive actuator acting upon said locking means to cause engagement with said toothed sprocket when a deceleration level above said predetermined level is sensed;
   said automatic locking retractor including a cantilevered spring member having a first end secured to said retractor frame, an offset portion and a second end operable to engage said locking means, said cantilevered spring member being operable for selectively biasing said locking means between a first position disengaged from said toothed sprocket for permitting withdrawal of webbing from said spool and a second position engaged with said toothed sprocket for preventing substantial withdrawal of said webbing when said apparatus is operating as an automatic locking retractor;

a cam member attached to said retractor frame and adapted to act on said offset portion of said cantilevered spring member, said cam member movable in a first direction for urging said cantilevered spring member to bias said locking means to said first position whereby said locking means is operable in response to said inertia sensitive actuator such that said apparatus operates as said emergency locking retractor, and said cam member is movable in a second direction for urging said cantilevered spring member to bias said locking means to said second position whereby said apparatus operates as said automatic locking retractor;

said offset portion of said cantilevered spring member is adapted to coact with said cam member such that said cam member tends to remain in either of said first or second pivoted directions;

first switching means acting on said cam member for forcing said cam member in said first direction, and second switching means acting on said cam member for forcing said cam member in said second direction.

10. The seat belt retractor according to claim 9 wherein said cam member has a first end attached to said retractor frame and a second end displaced from said first end, and wherein said first switch means is associated with said webbing such that when said spool has a predetermined quantity of webbing wrapped thereon said webbing acts on said second end of said cam member for urging said cam member in said first direction.

11. The seat belt retractor according to claim 10 wherein said second switching means comprises a switching lever affixed to said retractor frame, said switching lever acting on said second end of said cam member for forcing said cam member in said second direction.

12. The seat belt retractor according to claim 11 further comprising means for engaging said switching lever when said webbing is substantially withdrawn from said spool.

13. The seat belt retractor according to claim 12 wherein said engaging means comprises a free end of said seat belt webbing adapted to engage said switching lever.

14. The seat belt retractor according to claim 12 wherein said switching lever is arcuate in shape and is pivotably attached to said retractor frame.

15. The seat belt retractor according to claim 14 wherein said switching lever forms first and second terminal ends, said first terminal end adapted to act on said engaging means, said second terminal end acting on said second end of said cam member and pivotally moving said cam member in said second direction when said engaging means engages said first terminal end.

16. The seat belt retractor according to claim 15 wherein said switching lever pivots about a cross member component of said retractor frame.

17. A dual-mode seat belt retractor apparatus which may be operated either as an emergency locking retractor or as an automatic locking retractor comprising:

a retractor frame;

a spool rotatable within said retractor frame and having at least one toothed sprocket;

a locking bar movable with respect to said toothed sprocket between a first position disengaged from said toothed sprocket for permitting withdrawal of webbing from said spool and a second position engaged with said toothed sprocket for preventing withdrawal of said webbing from said spool;

said emergency locking retractor including an inertia sensitive actuator operable for moving said locking member from said first position to said second position when a deceleration level above a predetermined level is sensed;

said automatic locking retractor including:

a deflectable member having a first end fixed to said retractor frame and a second end that is angularly deflectable with respect to said first end;

a cam member supported for pivotable movement from said retractor frame and adapted to act on said deflectable member, said cam member being movable in a first direction for moving said deflectable member to a non-deflected position such that said second end of said deflectable member is displaced from said locking bar for permitting said locking bar to move to said first position, said cam member being movable in a second direction for resiliently deflecting said deflectable member to a deflected position such that said second end of said deflectable member contacts said locking bar for moving said locking bar to said second position; and switching means acting on said cam member for moving said cam member in said first and second directions in response to the quantity of said webbing wrapped on said spool.

18. The seat belt retractor apparatus of claim 17 wherein said switching means causes said cam member to move in said first direction in response to substantially complete retraction of said webbing onto said spool such that said retractor apparatus operates as an emergency locking retractor, said switching means causing said cam member to move in said second direction in response to substantially complete withdrawal of said webbing from said spool such that said retractor operates as an automatic locking retractor.

19. The seat belt retractor apparatus of claim 18 wherein said deflectable member is an elongated spring member having an intermediate offset portion that is configured to retain said cam member in either of said first and second directions.

* * * * *